United States Patent [19]

Cawlfield et al.

[11] Patent Number: 5,318,762

[45] Date of Patent: Jun. 7, 1994

[54] PROCESS FOR TREATING AQUEOUS SOLUTIONS OF HYDROXYLAMINE SALTS CONTAINING EXCESS ACID

[75] Inventors: David W. Cawlfield; Donald B. Loftis; Sanders H. Moore; Elizabeth K. Walter, all of Cleveland, Tenn.

[73] Assignee: Olin Corporation, Cheshire, Conn.

[21] Appl. No.: 988,060

[22] Filed: Dec. 9, 1992

[51] Int. Cl.$^5$ ................. C01B 21/20; C07C 239/08
[52] U.S. Cl. ............................... 423/387; 564/300; 564/301
[58] Field of Search ................. 423/387; 564/300, 301

[56] References Cited

U.S. PATENT DOCUMENTS

| | | | |
|---|---|---|---|
| 4,147,623 | 4/1979 | Koff et al. | 423/387 |
| 4,202,765 | 5/1980 | Koff et al. | 423/387 |
| 4,849,073 | 7/1989 | Dotson et al. | |
| 4,851,125 | 7/1989 | Dotson et al. | |
| 4,968,394 | 11/1990 | Dotson et al. | |

*Primary Examiner*—Wayne Langel
*Attorney, Agent, or Firm*—Dale Lynn Carlson

[57] ABSTRACT

A process for treating solutions of a hydroxylammonium salt containing excess acid which comprises:

a) mixing the hydroxylammonium salt containing excess acid with a hydroxylammonium solution containing free hydroxylamine to produce a solution of the hydroxylammonium salt substantially free of excess acid, b) contacting a portion of the solution of the hydroxylammonium salt substantially free of excess acid with a weak base ion exchange resin to produce the hydroxylammonium solution containing free hydroxylamine, and, c) recycling the hydroxylammonium solution containing free hydroxylamine to step a).

The process minimizes the decomposition of the hydroxylammonium salt solution and produces high purity hydroxylammonium nitrate solutions without directly contacting excess nitric acid with ion exchange resins. In addition to hydroxylammonium salts, the process can be used to treat any nitrate salt of an anine weak base which contains excess nitric acid.

15 Claims, No Drawings

PROCESS FOR TREATING AQUEOUS SOLUTIONS OF HYDROXYLAMINE SALTS CONTAINING EXCESS ACID

STATEMENT AS TO RIGHTS TO INVENTIONS MADE UNDER FEDERALLY-SPONSORED RESEARCH AND DEVELOPMENT

The U.S. Government has rights in this invention pursuant to Contract No. DAAA15-89-C-0011 awarded by the Department of Army. Under this contract, the U.S. Government has certain rights to practice or have practiced on its behalf the invention claimed herein without payment of royalties.

BACKGROUND OF THE INVENTION

The present invention relates to a process for treating solutions of a hydroxylammonium salt containing excess acid. More particularly, the present invention relates to the production of highly pure aqueous solutions of hydroxylammonium nitrate of high concentrations.

Hydroxylammonium nitrate has several commercial applications, such as in the purification of plutonium metal, as one component of a liquid propellant, and as a reducing agent in photographic applications. In some of these applications a highly purified form of the compound is required, especially when it is to be employed in propellant formulations where the hydroxylammonium nitrate (HAN) solution is stable in an aqueous solution, but must be substantially free of excess acids as well as transition metal elements, such as iron and copper.

High purity hydroxylammonium salt solution such as hydroxylammonium nitrate can be produced in an electrochemical process described in U.S. Pat. No. 4,849,073 issued Jul. 18, 1989 to R. L. Dotson et al. The process feeds nitric acid to the cathode compartment of an electrochemical cell having a separator between the anode and cathode compartment. The catholyte is electrolyzed at a temperature below about 50° C. and a cathode half-cell potential at from about −0.5 to about −3 volts to produce a hydroxylammonium nitrate solution. This solution is acidic, containing an excess of nitric acid.

Neutralization of the excess acid is described in U.S. Pat. No. 4,968,394, issued Nov. 6, 1990 to R. L. Dotson et al. The excess acid can be neutralized by mixing hydroxylamine vapor or nitric oxide with the hydroxylammonium nitrate containing excess acid. The excess acid in the solution is converted to hydroxylammonium nitrate. U.S. Pat. No. 4,968,394 further teaches that the excess acid can be reduced by contacting hydroxylammonium nitrate containing excess acid with a basic anion exchange resin. Preferably the anion exchange resin has a pKa in the range of 5 to 9.

However, direct contact of a basic anion exchange resin with a hydroxylammonium nitrate solution containing excess nitric acid results in oxidation of the resin by the nitric acid with accompanying decomposition and loss of capacity.

SUMMARY OF THE INVENTION

It is an object of the present invention to provide a process for treating excess acid in hydroxylammonium salt solutions while minimizing the decomposition of the hydroxylammonium salt solution. Another object of the invention is to produce high purity hydroxylammonium nitrate solutions without directly contacting excess nitric acid with ion exchange resins. A further object of the invention is to produce free hydroxylamine in stable solutions containing controlled concentrations. An additional object of the present invention is to minimize the exposure of concentrated hydroxylammonium salt solutions to stronger basic or transition metal ions.

These and other objects of the invention are accomplished in a process for treating solutions of a hydroxylammonium salt containing excess acid which comprises:

a) mixing the hydroxylammonium salt containing excess acid with a hydroxylammonium solution containing free hydroxylamine to produce a solution of the hydroxylammonium salt substantially free of excess acid, b) contacting a portion of the solution of the hydroxylammonium salt substantially free of excess acid with a weak base ion exchange resin to produce the hydroxylammonium solution containing free hydroxylamine, and, c) recycling the hydroxylammonium solution containing free hydroxylamine to step a).

DESCRIPTION OF THE PREFERRED EMBODIMENTS

The solution containing excess acid used in the process of the invention can be that of any hydroxylammonium salt including, for example, hydroxylammonium nitrate, hydroxylammonium chloride, or hydroxylammonium sulfate. To simplify the description, the invention will be described in terms of hydroxylammonium nitrate, a preferred embodiment. In practising the process of the invention, a solution of hydroxylammonium nitrate containing excess acid is fed to a mixing zone. Also fed to the mixing zone is a solution containing free hydroxylamine. The mixing zone is preferably of limited volume and provides rapid mixing of the solutions to limit the residence time of the solution of hydroxylammonium nitrate produced. Suitable residence times are in the range of from about 0.1 to about 10 hours, where the residence time is calculated as the ratio of volume of the mixing device divided by the flow rate of the treated solution from the mixing zone. During the treatment of the solution of hydroxylammonium nitrate containing excess free acid the temperature is maintained at from about −10° to about +50° C., and preferably from about 0° to about 45° C.

Following treatment, the product solution of hydroxylammonium nitrate has an excess acid concentration in the range of from about −0.3 to about +0.3 wt % (negative values for the excess acid concentration indicate an excess of free hydroxylamine). To permit more accurate control of the amount of excess acid in the product solution of the hydroxylammonium nitrate, the novel process of the invention preferably employs two treatment systems. In the first system, the solution of hydroxylammonium nitrate containing free hydroxylamine is added to the hydroxylammonium nitrate solution containing excess free acid in an amount which provides an excess of free hydroxylamine. This solution has an excess acid concentration in the range of from about 0.0 to about −1.5 wt %. This solution is then admixed with an additional amount of the hydroxylammonium nitrate solution containing excess free acid to produce a product solution of hydroxylammonium nitrate having an excess of acid in the range of from about −0.3 to about +0.3, preferably from about −0.05 to about +0.2 wt %, and more preferably for propellant applications, from about −0.1 to about +0.01 wt %. In this second reaction, the residence time in the second mixing zone is greater than the residence time in the first mixing zone. For example, the residence time in the second mixing zone in which the hydroxylammonium nitrate solution containing excess free acid is added to the hydroxylammonium nitrate solution containing an excess of free hydroxylamine is preferably much greater i.e. from about 10 to about 300, and more preferably from about 50 to about 150 times greater than the residence time in the first mixing zone.

The treatment process is monitored, for example, by determination of the pH of the product solution in each system. Where a solution of hydroxylammonium nitrate containing excess free acid is being neutralized, the pH of the pure product solution, having a concentration of hydroxylammonium nitrate in the range of from about 2.0 to about 4.0 moles, is in the range of from about 1.9 to about 2.8, and preferably from about 2.0 to about 2.5. Using the two system treatment process, the first reaction solution containing an excess of hydroxylamine is maintained at a pH in the range of from about 2 to about 4, and preferably from about 2.5 to about 3.5.

In the production of solutions containing free hydroxylamine, to maintain high purity and minimize the introduction of impurities, the treated product solution of the hydroxylammonium salt substantially free of excess acid is fed to a column containing a weak base anionic exchange resin. The resin extracts the anionic group, e.g. nitrate ions, and a solution containing free hydroxylamine is recovered as the column effluent. This solution containing free hydroxylamine has a pH in the range of from about 4 to about 6.5. As discussed above, this solution containing free hydroxylamine is admixed with the acidic solution of the hydroxylammonium salt containing excess acid to produce the hydroxylammonium salt product solution substantially free of excess acid.

Suitable anion exchange resins for converting hydroxylammonium salt solutions substantially free of excess acid to solutions containing free hydroxylamine are weak base anionic exchange resins having a pKa in the range of about 5 to 9. Exemplary resins include macroporous polystyrene resins, polyacrylic resins, polyamine condensation resins, and phenol-formaldehyde resins in microreticulate or gel forms. Of these, macroporous polystyrene resins and polyacrylic resins are preferred, with polyacrylic resins in gel form being particularly preferred. Specific examples of the preferred resins include BIORAD® AG3×4, DOWEX® WGR, MITSUBISHI® WA-21J, MITSUBISHI® WA-101, and SYBRON-IONAC A-365 among others.

Regeneration of the resin should be accomplished without introducing undesired ions which contaminate the resin and consequently the product solution. In one embodiment, the resin is first flushed with an inert gas to displace hydroxylammonium solution and then washed with purified water to remove residual hydroxylammonium salt. Purification of the water can be accomplished by any means that ensures the complete removal of transition metal ions including ion exchange, reverse osmosis, or distillation. Suitable regenerants are purified strong aqueous base solutions such as ammonium hydroxide solutions containing from about 1 to about 20 wt % of $NH_4OH$. These solutions can be prepared for example, by adding ammonia to purified water.

Where, for example, the product solution is a solution of hydroxylammonium nitrate substantially free of excess acid which may be employed in the production of liquid propellants, it is important to select materials of construction for mixers, columns etc which will minimize possible contamination with impurities such as transition metals i.e. copper or iron. Also undesireable as impurities are chloride and sulfate ions. Any material which resists attack by dilute nitric acid may be used in the of construction for equipment used in the process of the invention. Examples include fluoropolymers, PVC, C-PVC, valve metals such as tantalum among others. Stainless steel can be employed when metal contamination is not a consideration. For propellant applications, the solution of hydroxylammonium nitrate substantially free of excess acid preferably has substantially less than about 1 part per million (ppm) of transition metal elements and less than about 1 ppm chloride and less than about 10 ppm of sulfate.

As the product, the solution of hydroxylammonium nitrate substantially free of excess acid may be further concentrated in one of several known ways including that of U.S. Pat. No. 4,851,125, issued Jul. 25, 1989 to R. L. Dotson et al. In this process a dilute solution of a hydroxylammonium salt is contacted with the sorption side of a membrane to sorb the solvent. U.S. Pat. No. 4,851,125 is incorporated by reference in its entirety.

Solutions of hydroxylammonium salts containing excess free acid such as hydroxylammonium nitrate used as a starting material in the process of the present invention can be produced, for example by the electrochemical process described in U.S. Pat. No. 4,989,073 which issued Jul. 18, 1989 to R. L. Dotson et al. In this process, aqueous nitric acid solutions are electrolyzed as the catholyte in an electrochemical cell having a cathode compartment, an anode compartment, and a separator between the anode compartment and the cathode compartment. The electrolysis is carried out at cathode half-cell potentials in the range of −0.5 to −3 volts while maintaining the catholyte temperature at below about 50° C. The excess amount of nitric acid in the solutions of hydroxylammonium nitrate produced by the process of U.S. Pat. No. 4,849,073, may be up to about 1.2 moles per liter, and is normally at from about 0.1 to about 0.8 moles per liter. U.S. Pat. No. 4,849,073 is incorporated by reference in its entirety.

The process of the present invention may be used to treat substituted hydroxylammonium salts including alkyl substituted hydroxylammonium salts such as diethyl hydroxylammonium nitrate. Further, the nitrate salts of any amine weak base containing an excess of nitric acid may be treated. Inorganic amines include hydrazine, alkyl hydrazines, aromatic hydrazines and alkyl substituted aromatic hydrazines. Organic amines which are suitably treated include alkyl amines and derivatives thereof, aromatic amines such as pyridine and picoline and derivatives including alkyl substituted pyridines and picolines.

To further illustrate the invention the following example is provided without any intention of being limited thereby. All parts and percentages are by weight unless otherwise specified.

EXAMPLE

A solution of hydroxylammonium nitrate, having a concentration of 3.6 molar $NH_2OH \cdot HNO_3$ and containing +0.8 wt % excess nitric acid, was fed continuously to a static mixer having a volume of about 0.7 liters at a circulation rate of 22.7 liters/min. Also continuously fed to the static mixer at the same rate was a solution of hydroxylammonium nitrate containing an excess of free hydroxylamine having a pH in the range of 4 to 6.25. The treated hydroxylammonium nitrate solution was continuously removed from the mixing tank at a rate of 0.4 liters/min. This solution, having a pH in the range of from about 2.5 to about 3.5, was continuously fed at a rate of about 0.3 liters/min to a second mixing tank having a volume of about 85 liters and equipped with an agitator. A solution of hydroxylammonium nitrate, having a concentration of 3.6 molar $NH_2OH.HNO_3$ and containing +0.8 wt % excess nitric acid, was fed continuously to the second mixing tank. A product solution was removed having a pH in the range of 1.98 to 2.03. A portion of the product solution was fed to an ion exchange column containing a weak base anionic exchange resin (SYBRON-IONAC A-365) at a rate of about 0.3 L/min. The effluent from the ion exchange column was a solution of hydroxylammonium nitrate containing an excess of free hydroxylamine having a pH in the range of 4 to 6.25. This solution of hydroxylammonium nitrate containing an excess of free hydroxylamine was fed to the static mixer.

What is claimed is:

1. A process for treating solutions of a hydroxylammonium salt containing excess acid which comprises:
   a) mixing the hydroxylammonium salt containing excess acid with a hydroxylammonium solution containing free hydroxylamine, in the absence of ion-exchange resin, to produce a solution of the hydroxylammonium salt substantially free of excess acid,
   b) contacting a portion of the solution of the hydroxylammonium salt substantially free of excess acid with a weak base ion exchange resin to produce the hydroxylammonium solution containing free hydroxylamine, and,
   c) recycling the hydroxylammonium solution containing free hydroxylamine to step a).

2. The process of claim 1 in which the hydroxylammonium salt containing excess acid is selected from the group consisting of hydroxylammonium nitrate, hydroxylammonium chloride, and hydroxylammonium sulfate.

3. The process of claim 1 in which the concentration of excess acid in the solution of the hydroxylammonium salt substantially free of excess acid is in the range of from about −0.3 to about +0.3 wt %.

4. The process of claim 1 in which the hydroxylammonium solution containing free hydroxylamine has a pH in the range of from about 4 to about 6.5.

5. A process for treating solutions of a hydroxylammonium salt containing excess acid which comprises:
   a) mixing the solution of hydroxylammonium salt containing excess acid, in the absence of ion-exchange resin, in a first mixing zone with an amount of a solution containing free hydroxylamine sufficient to produce a solution of the hydroxylammonium salt containing an excess of free hydroxylamine,
   b) mixing the solution of the hydroxylammonium salt containing an excess of free hydroxylamine in a second mixing zone with a second portion of the acidic solution of a hydroxylammonium salt containing excess acid to produce a solution of the hydroxylammonium salt substantially free of excess acid,
   c) contacting a weak base ion exchange resin with a portion of the solution of the hydroxylammonium salt substantially free of excess acid to produce the solution containing free hydroxylamine, and,
   d) recycling the solution containing free hydroxylamine to step a).

6. The process of claim 5 in which the hydroxylammonium salt containing excess acid is selected from the group consisting of hydroxylammonium nitrate, hydroxylammonium chloride, and hydroxylammonium sulfate and their alkyl substituents.

7. The process of claim 5 in which the concentration of excess acid is in the range of from about +0.05 to about +0.2 wt %.

8. The process of claim 5 in which the the residence time in the second mixing zone from about 10 to about 300 times greater than the residence time in the first mixing zone.

9. The process of claim 5 in which the hydroxylammonium solution containing free hydroxylamine has a pH in the range of from about 4 to about 6.5.

10. The process of claim 5 in which the weak base ion exchange resin is selected from the group consisting of anionic exchange resins having a pKa in the range of about 5 to 9.

11. The process of claim 6 in which the hydroxylammonium salt is selected from the group consisting of hydroxylammonium nitrate and alkyl substituted hydroxylammonium nitrate.

12. The process of claim 11 in which the hydroxylammonium salt is hydroxylammonium nitrate.

13. The process of claim 12 in which the solution of hydroxylammonium nitrate substantially free of excess acid has an excess acid concentration in the range of from about +0.05 to about +0.2 wt %.

14. The process of claim 12 in which the hydroxylammonium solution containing free hydroxylamine has a pH in the range of from about 4 to about 6.5.

15. A process for treating solutions of a nitrate salt of an amine weak base containing excess nitric acid which comprises:
   a) mixing the nitrate salt of an amine weak base containing excess nitric acid with a hydroxylammonium solution containing free hydroxylamine to produce a solution of the the nitrate salt of the amine weak base substantially free of excess acid,
   b) contacting a portion of the solution of the nitrate salt of the amine weak base substantially free of excess acid with a weak base ion exchange resin to produce the hydroxylammonium solution containing free hydroxylamine, and,
   c) recycling the hydroxylammonium solution containing free hydroxylamine to step a).

* * * * *